Oct. 10, 1933.　　　T. H. SYMINGTON　　　1,929,717
LATERAL MOTION TRUCK FOR ELECTRIC CARS
Filed Jan. 17, 1931　　　2 Sheets-Sheet 1
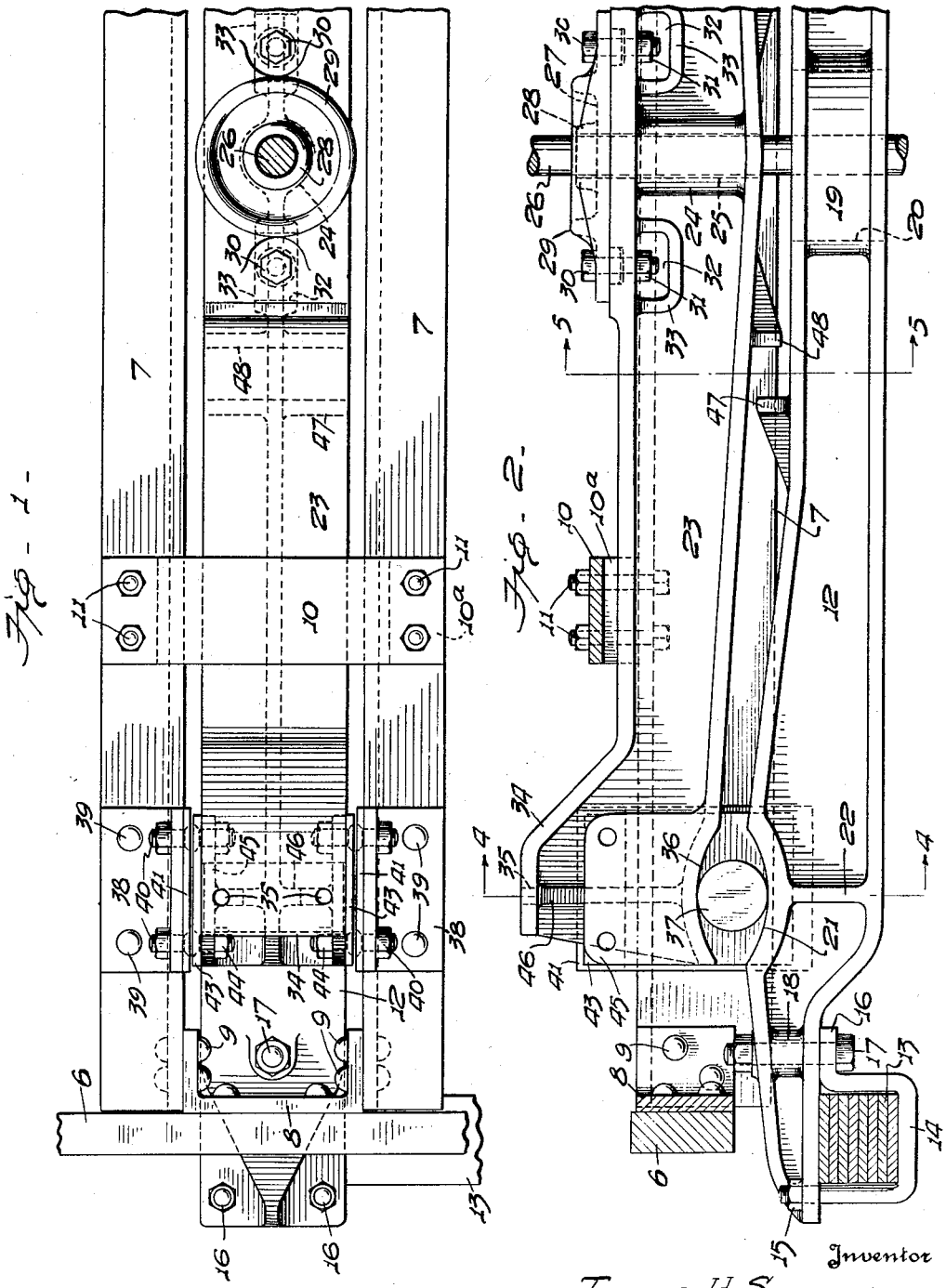
Inventor
Thomas H. Symington
By John Milton Jester
Attorney Oct. 10, 1933.    T. H. SYMINGTON    1,929,717
LATERAL MOTION TRUCK FOR ELECTRIC CARS
Filed Jan. 17, 1931    2 Sheets-Sheet 2
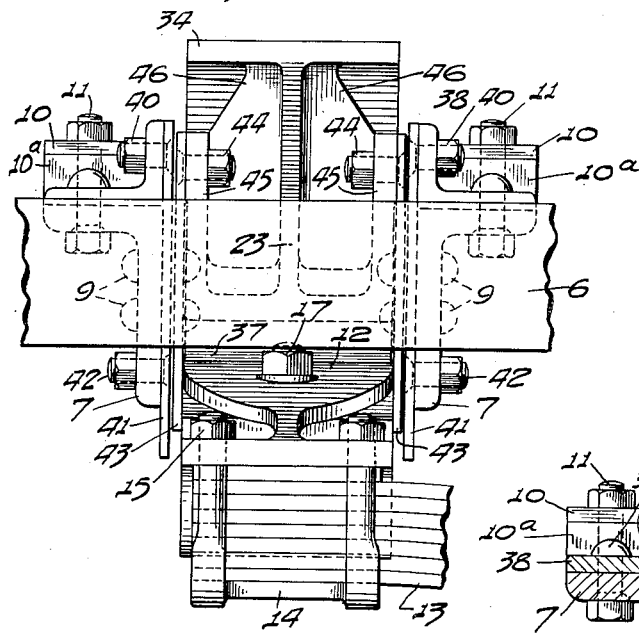
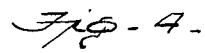
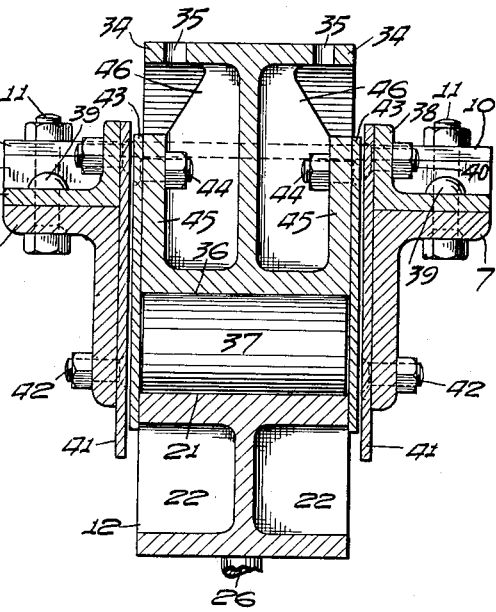
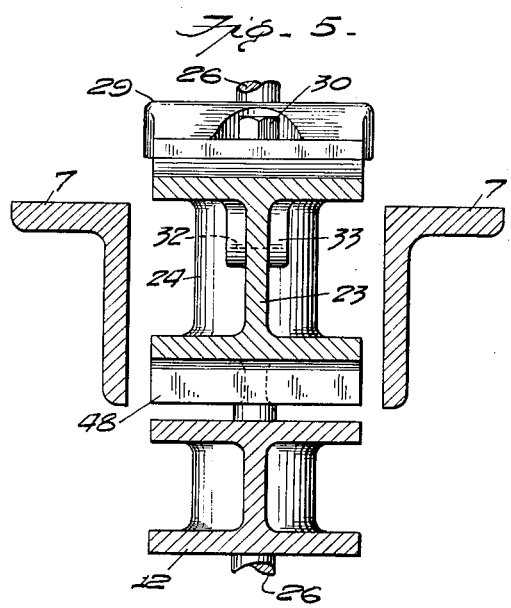
Inventor
THOMAS H. SYMINGTON
By John Milton Jester
Attorney Patented Oct. 10, 1933

1,929,717

UNITED STATES PATENT OFFICE 1,929,717

LATERAL MOTION TRUCK FOR ELECTRIC CARS

Thomas H. Symington, Baltimore, Md., assignor to T. H. Symington & Son, Inc., Baltimore, Md., a corporation of Maryland Application January 17, 1931. Serial No. 509,518

12 Claims. (Cl. 105—186)

The invention relates to trucks particularly designed for use in connection with electric cars, though not necessarily restricted thereto, and has for its general object the provision of a novel truck for this purpose of such formation as to permit lateral motion of the car body with respect to the truck so as to improve the riding qualities of the car and greatly reduce the strain on the structure resulting from shocks and jars which ordinarily come upon he mechanism unless means be provided for their absorption.

An important object of the invention is to provide a lateral motion truck device which may be said to embody or include a main bolster enclosing or partly within which is an auxiliary bolster which is movable laterally of the truck and which of course supports whatever body bolster is present on the car body.

Another object of the invention is to provide a lateral motion truck in which the inner or auxiliary bolster is supported upon and above the main bolster by rollers coacting with curved seats so as to exert a lifting action on the movable bolster, when lateral motion occurs as the result of the development of centrifugal force when the car rounds a curve, passes over a crossover, or the like, this lifting action constituting means for absorbing the lateral motion shock in a free and easy manner, the coacting rollers and seats further operating to return the movable bolster member to its normal or centered position upon the cessation of the lateral motion producing force.

A further object of the invention is to provide the relatively movable and stationary bolster members with coacting chafing plates which will operate partly to maintain the members in the proper relative positions at all times and also to take the wear, these plates being readily replaceable when excessively worn, the plates on the relatively movable member moreover confining the rollers against endwise shifting and taking any end thrust which they might tend to exert.

Another object of the invention is to provide a bolster construction possessing the above pointed out characteristics and yet capable of being mounted upon the ordinary elliptic springs commonly provided in electric car trucks.

A still further object of the invention is to provide a bolster construction of this character embodying stop means on the relatively movable members acting to limit the lateral motion so as to prevent any overthrow which might conceivably occur under unusual circumstances.

An additional object of the invention is to provide a structure of this character which will be comparatively simple and inexpensive to make, assemble and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a top plan view of slightly more than one half of a bolster structure constructed in accordance with my invention.

Figure 2 is a side elevation thereof with parts broken away and in section,

Figure 3 is a fragmentary end elevation,

Figure 4 is a vertical cross section taken on the line 4—4 of Figure 2, and

Figure 5 is a similar view taken on the line 5—5 of Figure 2.

Referring more particularly to the drawings the truck is shown as comprising side frames 6, only one of which is shown, which may be of the ordinary construction. Quite naturally the truck is intended to be equipped with the usual journal boxes, axles and wheels, not shown, and it is obvious that whatever main frame is provided is suitably connected with such parts. The truck further includes transverse bars 7 preferably formed as angle irons which are secured to the side frames 6 by the interposition of U-shaped brackets 8 to which they are riveted as at 9, the brackets being secured to the side frames in any desired manner whatsoever. The bars 7 are shown as connected by a transverse plate member 10 bolted or otherwise suitably secured at 11 and spaced above the top thereof by means of spacing blocks 10ª interposed between the plate member and the bars at the ends of the former. Of course this structure is duplicated at both sides of the truck though only one side is illustrated as being entirely adequate to disclose the invention.

The stationary portion of the truck further includes a main bolster member 12 preferably formed of I-beam shape in cross section at least throughout its major portion. This member 12 is located beneath the bars 6 of the side frame and has its ends projecting slightly therebeyond and engaged upon the usual elliptic springs 13 to which they are secured by appropriate shackles 14, these shackles being disclosed as of substantially U-shape with one end arm extending up through the end of the bolster member 12 and equipped with a nut 15 and with the other arm formed with a lateral extension 16 lying against the underside of the member 12 and secured thereto as by a bolt 17 extending through a boss 18 formed in the member 12. At the center or axis of the truck the bolster member 12 is formed with a boss or thickened portion 19 provided with an elongated slot 20 for a purpose to be described.

Near its outer ends, but inwardly of the side frames, the bolster member 12 is formed in its top with a concaved curved seat 21 at which point reinforcement is effected by a web 22 extending from the top to the bottom of the bolster member. These seats are preferably at the highest points of the bolster member and from them the top surface slopes downwardly toward the outer ends and downwardly toward the center.

The movable or auxiliary bolster member is indicated by the numeral 23 and is formed as a casting of general I-beam shape. This member is located above the main bolster member 12, between the bars 7 and beneath the transverse members 10. At its center the movable bolster member is provided with a boss 24 having a cylindrical opening 25 therein for the reception of a king pin 26 which passes downwardly and which is accommodated within the slot 20 above referred to. Secured upon the top of the movable bolster 23 at its center is a center bearing 27 having a central boss 28 through which the king pin extends and including a peripheral retaining flange 29 of circular shape. This center bearing may be held in place by any desired means such as the bolts 30 which pass through the upper flanges of the member 23 and which carry nuts 31 located within openings 32 in the vertical web of the member 23, reinforcing beads 33 being provided at the edges of these openings. This center bearing is intended and adapted to support whatever center plate may be carried by the car or body bolster thereof, not shown. The end portions of the movable bolster 23 are extended upwardly as at 34 and are disclosed as apertured at 35 to permit bolting thereto of a conventional type of truck or other side bearing members for supporting the end portions of the car body bolster, as is customary. The ends of the bolster 23 are provided at their undersurfaces with upwardly curved concave seats 36 above and opposite the seats 21. These adjacent seats have disposed between them rollers 37 for the purpose of permitting lateral motion of the bolster member 23 with respect to the bolster member 12.

The means for guiding the bolster member 23 during its lateral motion with respect to the main bolster 12, and at the same time for taking up wear, comprises angle plates 38 secured as at 39 to the bars 7 and having secured thereto as by bolts 40, chafing plates 41 which extend downwardly below the lower edges of the bars 7 to which they are also secured as by bolts 42. Other chafing plates 43 are secured as by bolts 44 to upstanding side flanges 45 on the movable bolster 23 at the seats 36, the plates 43 extending downwardly below the seats 21 on the main bolster member 12. Clearly, the chafing plates 41 and 43 will act to maintain the movable bolster member 23 in its proper position between the bars 7, to guide the member 23 during lateral motion, and also to take any wear which may occur as the result of friction. These plates are readily replaceable when unduly worn. It may be well to state in passing that to strengthen the ends of the bolster member 23 at their roller engaging portions it is preferable to provide webs 46 merging into the flanges 45 and into the top flange of the I-beam structure.

Assuming that a truck has been constructed embodying this bolster structure and that a car body bolster, not shown, is mounted upon the movable bolster member 23 with its center plate engaged within the center bearing 27, it will be understood that under ordinary circumstances, that is to say when the car is travelling straight-ahead, the movable bolster member 23 will be in centered relation to the main bolster member 12, that is to say in the position shown in Figures 1 and 2. Swivelling movement of the car body with respect to the truck occurs at the center plate 27 in the usual manner. However, in the event that the car passes over curved track or over a cross-over, onto a switch, or the like, there is invariably developed a certain amount of centrifugal force. With this particular construction the centrifugal force developed will cause the bolster member 23 to move laterally of the truck, the seats 36 rolling upon the rollers 37 and the latter moving upon the seats 21. Owing to the curvature of these seats it will be clear that a lifting effect is exerted upon the auxiliary bolster 23 and this force counteracts or absorbs the centrifugal force so that instead of there being a sudden shock or jar to the passengers, or lading, and the parts, there will be a free and easy movement which will be a distinct improvement in so far as the riding qualities of the car are concerned. Naturally upon the cessation of the force tending to move the auxiliary bolster laterally gravity will act to return the movable bolster to its normal or centered position.

It is desirable to prevent excess movement such as might for instance cause the seats 21 and 36 to pass beyond the rollers and I accordingly provide abutments 47 on the top of the main bolster member 12 adapted to be engaged by similar abutments 48 on the underside of the auxiliary bolster 23, these abutments coming into contact when the auxiliary bolster has moved to the maximum desirable and permissible extent and consequently functioning as a safety factor.

From the foregoing description and a study of the drawings it will be apparent that I have thus provided a simple bolster construction which is particularly well adapted for use in electric car trucks and which will, by virtue of the permissibility of the lateral motion, endow the car with the advantageous characteristics of modern freight and other railroad car trucks of the lateral motion type. It may not be necessary to redesign the entire truck to permit use of my bolster structure as it is conceivable that the features thereof may be embodied in a replacement unit or assembly so that already existing equipment need not be entirely discarded. It is thought from the above that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a car truck, a frame, a spring supported main bolster mounted therein, an auxiliary bolster located within the confines of the frame and above the main bolster, bearing means located at the center of the auxiliary bolster, said bolsters having their confronting faces formed near their end portions with oppositely curved seats, and rollers engaged between said seats, both bolsters being of I section and provided with reinforcing webs at said seats.

2. In a car truck, side frames, a frame structure located between and secured to the side frames, a main bolster extending between the side frames entirely below said frame structure and spring supported, an auxiliary bolster located within and projecting above said frame structure and above said main bolster, means connecting the main and auxiliary bolsters for enabling the latter to have lateral motion, and a swiveling bearing means on the top of the auxiliary bolster.

3. In a car truck, side frames, a frame structure including spaced bars of inverted L-shape in cross section extending between and secured to the side frames, a main bolster extending between the side frames and located entirely below said bars and spring supported, and an auxiliary bolster provided at its center with bearing means and mounted upon said main bolster and between said bars for movement laterally of the truck, and L-shaped brackets on said spaced bars cooperating with the auxiliary bolster to guide the same.

4. In a car truck, side frames, a frame structure secured thereto and extending therebetween and including spaced bars, a main bolster extending between the side frames, an auxiliary bolster located above said main bolster and between said bars, swiveling bearing means on the top of the auxiliary bolster at its center, means connecting the bolsters and enabling the auxiliary bolster to move laterally of the truck, and combined guide and wear take-up means carried by said bars and the auxiliary bolster respectively and extending down below the rollers.

5. In a car truck, a main bolster of I beam section formed with seats, a frame structure including spaced bars of L section extending parallel with said main bolster, an auxiliary bolster of substantially I section mounted above said main bolster and movable laterally of the truck between said bars, said auxiliary bolster being provided at its bottom with seats, rollers located between and engaging said seats, and guide brackets secured on said bars adjacent the seats for cooperation with the auxiliary bolster.

6. In a car truck, a main bolster formed with seats, a frame structure including spaced bars extending parallel with said main bolster, an auxiliary bolster mounted above said main bolster and movable laterally of the truck between said bars, said auxiliary bolster being provided at its bottom with seats, rollers located between and engaging said seats, wear plates on said auxiliary bolster overlying the ends of the rollers, and coacting wear plates on the confronting faces of said bars.

7. In a car truck, a main bolster, a frame structure including spaced bars, an auxiliary bolster movable laterally of the truck and located above said main bolster and between said bars, swivelling bearing means on the auxiliary bolster, both of said bolsters being provided near their ends with oppositely curved seats, rollers mounted between the respective seats, chafing plates secured upon the opposite sides of the auxiliary bolster at said seats and extending downwardly below said rollers for preventing endwise shifting thereof.

8. In a car truck, a main bolster, a frame structure including spaced bars, an auxiliary bolster movable laterally of the truck and located above said main bolster and between said bars, swivelling bearing means on the auxiliary bolster, both of said bolsters being provided near their ends with oppositely curved seats, rollers mounted between the respective seats, chafing plates secured upon the opposite sides of the auxiliary bolster at said seats and extending downwardly below said rollers for preventing endwise shifting thereof, and other chafing plates secured upon the confronting faces of said bars and cooperating with said first named chafing plates for guiding the auxiliary bolster in its movement and taking up wear.

9. In a car truck, a main spring supported bolster of I beam construction formed with seats, a frame structure including spaced horizontal bars of uniform section parallel with said bolster, an auxiliary bolster of I beam construction located between said bars and above said main bolster and formed with seats opposite said first named seats, rollers located between the respective first and second named seats whereby the auxiliary bolster may move laterally of the truck, a center bearing carried by the top of the auxiliary bolster at its center, and a king pin extending through said center bearing and the auxiliary bolster and into said main bolster, both bolsters having thickened central bosses, the boss in the auxiliary bolster having a hole receiving the king pin, and the boss in said main bolster having an elongated slot accommodating said king pin at all positions of the auxiliary bolster with respect to the main bolster.

10. In a car truck, a main bolster, a frame structure including spaced bars, an auxiliary bolster mounted upon the top of said main bolster and located between said bars, bearing means interposed between the bolsters enabling the auxiliary bolster to move laterally of the truck, the end portions of the auxiliary bolster being offset upwardly to be in a higher plane than the center of the auxiliary bolster, and reinforcing means on the respective bolsters at said bearing means.

11. In a car truck, a main bolster, an auxiliary bolster located thereabove, bearing means interposed between the bolsters enabling the auxiliary bolster to move laterally of the truck, and stop means on the respective bolsters engageable for limiting lateral motion of the auxiliary bolster, said stop means comprising abutment elements provided respectively on the top of the main bolster and the underside of the auxiliary bolster.

12. In a car truck, side frames, a frame structure including spaced bars and bracket members secured thereto and to the side frames, a main bolster located below said frame structure, an auxiliary bolster mounted above the main bolster and between said bars, said bolsters being provided with confronting seats, rollers engaged between the respective seats, means carried by the auxiliary bolster for retaining the rollers against endwise movement, bearing means carried by the auxiliary bolster at the center of its top, chafing plates on the main bolster cooperating with said roller retaining means for taking wear, said roller retaining means and said chafing plates being replaceable.

THOMAS H. SYMINGTON.